United States Patent [19]

Dehnert

[11] 4,430,267
[45] Feb. 7, 1984

[54] METAL COMPLEX DYES DERIVED FROM 4-PHENYLAZO-5-AMINOPYRAZOLES

[75] Inventor: Johannes Dehnert, Ludwigshafen, Fed. Rep. of Germany

[73] Assignee: BASF Aktiengesellschaft, Rheinland-Pfalz, Fed. Rep. of Germany

[21] Appl. No.: 237,274

[22] Filed: Feb. 23, 1981

[30] Foreign Application Priority Data

Mar. 1, 1980 [DE] Fed. Rep. of Germany ....... 3007966

[51] Int. Cl.³ .................... C09B 29/036; C09B 29/46; D06P 1/10; D06P 3/52
[52] U.S. Cl. .................................. 260/147; 260/155; 260/163
[58] Field of Search ........................... 260/147, 146 R

[56] References Cited

U.S. PATENT DOCUMENTS 2,241,796 5/1939 Leverkusen et al. ............... 260/161

FOREIGN PATENT DOCUMENTS 1386619 1/1964 France .
402811 12/1963 Switzerland .
606871 1/1981 U.S.S.R. .

OTHER PUBLICATIONS

Journal of General Chemistry of the USSR, vol. 45, No. 11, pp. 2488–2492, 1975.

Chemistry of Heterocyclic Compounds, vol. 15, No. 9, pp. 1258–1264, 1979.

*Primary Examiner*—Floyd D. Higel
*Attorney, Agent, or Firm*—Oblon, Fisher, Spivak, McClelland & Maier

[57] ABSTRACT

Nickel complexes, obtained by heating one or more compounds of the general formula I

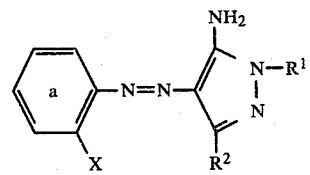

where
$R^1$ is hydrogen, unsubstituted or substituted alkyl, cycloalkyl, aralkyl, hetaralkyl, aryl or hetaryl,
$R^2$ is hydrogen or methyl and X is fluorine, chlorine, bromine or phenoxy, and
the ring a may additionally carry fused rings or be substituted and, if $R^1$ is isopropyl or phenyl and the ring a is unsubstituted, $R^2$ is hydrogen, in an organic solvent, in the presence of an acid acceptor and of a nickel donor, are exceptionally suitable for dyeing, in particular, cellulosic fibers.

6 Claims, No Drawings

METAL COMPLEX DYES DERIVED FROM 4-PHENYLAZO-5-AMINOPYRAZOLES

The present invention relates to nickel complexes which are obtained by heating one or more compounds of the general formula I

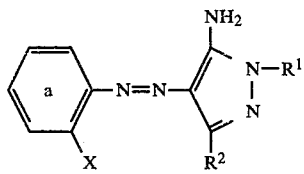

where
- $R^1$ is hydrogen, unsubstituted or substituted alkyl, cycloalkyl, aralkyl, hetaralkyl, aryl or hetaryl,
- $R^2$ is hydrogen or methyl and X is fluorine, chlorine, bromine or phenoxy, and
- the ring a may additionally carry fused rings or be substituted and, if $R^1$ is isopropyl or phenyl and the ring a is unsubstituted, $R^2$ is hydrogen, in an organic solvent, in the presence of an acid acceptor and of a nickel donor.

Examples of radicals $R^1$, in addition to hydrogen, are $C_1$–$C_{10}$-alkyl, which may be substituted by hydroxyl, alkoxy, phenoxy, cyano or amino, cyclohexyl, methylcyclohexyl, benzyl, chlorobenzyl, methylbenzyl, phenylethyl, phenylpropyl, phenylbutyl, furylmethyl, phenyl which is unsubstituted or substituted by fluorine, chlorine, bromine, methyl, ethyl, trifluoromethyl or nitro, and unsubstituted or substituted pyridyl and triazinyl.

Specific examples of radicals $R^1$, in addition to those already mentioned, are $CH_3$, $C_2H_5$, $C_3H_7$, $C_4H_9$, $C_5H_{11}$, $C_6H_{13}$, $C_8H_{17}$,

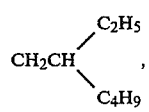

$CH(C_2H_5)_2$, $CH(C_3H_7)_2$, $C_9H_{19}$,

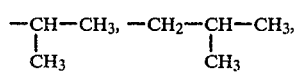

—$CH_2$—$CH_2$—CN, —$CH_2$—$CH_2$—OH, —$CH_2$—$CH_2$—$NH_2$,

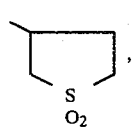

—$CH_2CH_2OC_6H_5$, $C_6H_4OCH_3$, $C_6H_4(OCH_3)_2$,

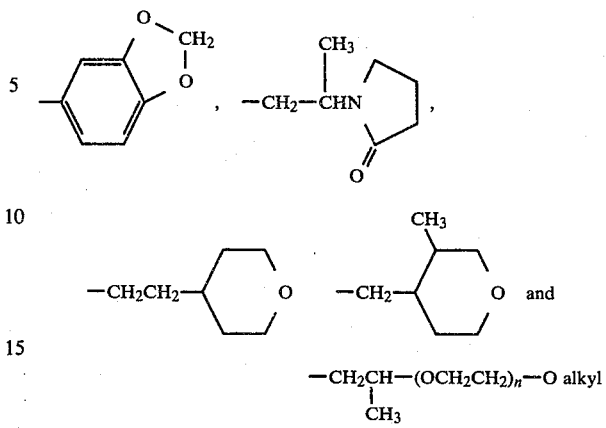

where
n = 1, 2, 3
alkyl = $CH_3$, $C_2H_5$ or

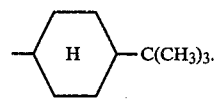

The ring a may, for example, additionally be substituted by fluorine, chlorine, bromine, trifluoromethyl, $C_1$–$C_4$-alkyl, cyclohexyl, $C_1$–$C_4$-alkoxy, aroxy, cyano, nitro, $C_1$–$C_4$-alkylsulfonyl, arylsulfonyl, a carboxylic acid ester group, unsubstituted or substituted carbamyl or sulfamyl, unsubstituted or substituted phenylazo or phthaloyl.

Specific examples of substituents, in addition to those already mentioned, are methyl, ethyl, n-propyl, i-propyl, n-butyl, i-butyl, t-butyl, methoxy, ethoxy, butoxy, phenoxy, chlorophenoxy, methylphenoxy, methylsulfonyl, ethylsulfonyl, phenylsulfonyl, $COOCH_3$, $COOC_2H_5$, $COOC_3H_7$, $COOC_4H_9$, $COOC_6H_{13}$, $COOC_8H_{17}$,

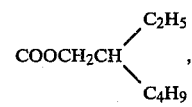

$COOC_{10}H_{21}$, $CONH_2$, $CONHCH_3$, $CONHC_2H_5$, $CONHC_4H_9$, $CON(CH_3)_2$, $CON(C_2H_5)_2$, the corresponding sulfamyl radicals, and phenylazo which is substituted by fluorine, chlorine, bromine, methyl, ethyl, cyano, nitro or the carboxylic acid ester radicals mentioned.

The ring a may additionally carry a fused ring which can be substituted by chlorine or bromine.

The ring a can furthermore have the structure

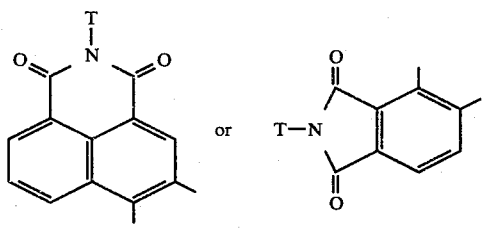

where T is hydrogen or unsubstituted or substituted alkyl.

Specific examples of substituents T are $CH_3$, $C_2H_5$, $C_4H_9$, $C_6H_{13}$,

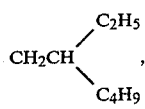

$CH_2CH_2OCH_3$, $(CH_2)_3OCH_3$, $CH_2C_6H_5$, $CH_2CH_2C_6H_5$ and

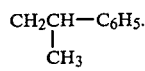

The compounds of the formula I may be prepared by reacting a diazonium compound obtained from a compound of the formula II

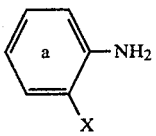

with a coupling components of the formula

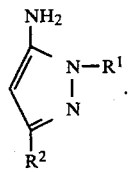

Nickel donors for the preparation of the novel nickel complexes include nickel sulfate, nickel acetate, nickel acetylacetonate, nickel formate and, preferably, nickel chloride, nickel nitrate and nickel carbonate.

Examples of suitable organic solvents are dimethylsulfoxide, diethylformamide, N-methylpyrrolidone, tetramethylurea and, preferably, dimethylformamide.

The reaction temperature is from 30° to about 210° C., especially from 50° to 160° C.

Examples of acid acceptors which are added to the reaction mixture are magnesium oxide, calcium carbonate, magnesium carbonate, sodium carbonate and, preferably, potassium carbonate.

As a rule, the reaction is complete in from 3 to 30 hours.

It is probable that the nickel complexes according to the invention have, at least in part, the structure

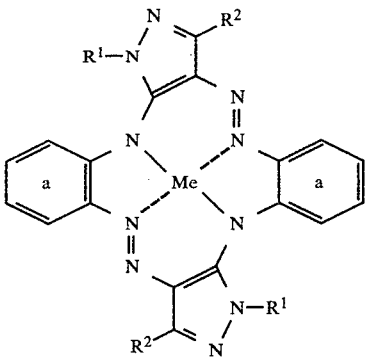
formula Ia and

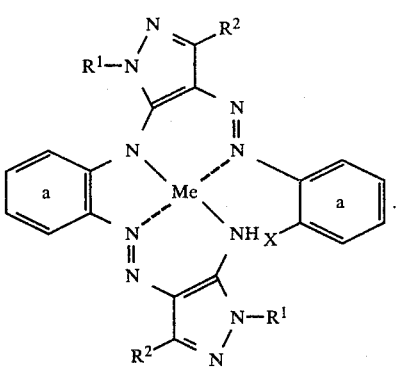
formula Ib

However, chromatographic investigation shows that other compounds are as rule also present, about whose structure no confirmed information is available.

If a plurality of compounds of the formula I is used as the starting material, even more complex product mixtures are obtained.

The compounds of the formula I are suitable for dyeing cellulosic fibers or cellulose-containing union fabrics, preferably cotton and polyester-cotton blends, and also polyesters, by the thermosol process. Furthermore, they may be used to color surface coatings and plastics and in some cases may be used as solvent dyes or as pigments.

Nickel complexes obtained from compounds of the formula I, where $R^2$ is hydrogen, are particularly important.

Examples of preferred radicals $R^1$ are cyclohexyl, benzyl, furylmethyl and phenyl.

Examples of preferred substituents of the ring a are fluorine, chlorine, bromine, nitro, methyl, 4-chlorophenoxy, phenylazo, 4'-chlorophenylazo, 2'-methylphenylazo, 3'-methylphenylazo and phthaloyl.

Where the novel dyes are used as aqueous dispersions, they can be converted to a saleable dye formulation as follows:

30 parts of dye, 6 parts of dispersant, 10 parts of water-retaining agent, 1 part of disinfectant and about 53 parts of water are milled in a stirred ball mill until the particle size is about 0.5 μm. The dye dispersion obtained is stable on storage.

EXAMPLE 1

38 parts of the dye 2,4,6-trichloroaniline→1-benzyl-5-aminopyrazole, as a dried powder, are stirred for 6 hours at 100° C. with 500 parts by volume of dimethylformamide, 14 parts of nickel nitrate hexahydrate and 47 parts of potassium carbonate. When the reaction mixture has cooled, the nickel complex obtained, of the probable formula

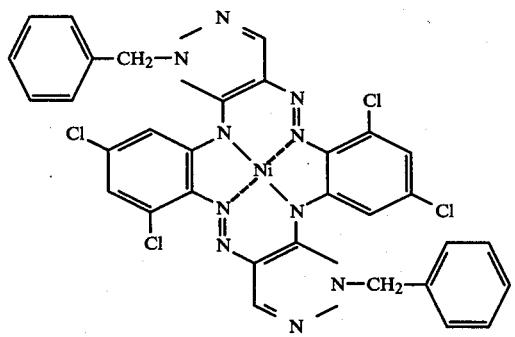

is filtered off, and washed with dimethylformamide, then with methanol, thereafter with hot water and again with methanol. After drying at 70° C., a loose, dark olive green crystal powder is obtained, which gives an olive green solution in hot N-methylpyrrolidone. Using the process described in German Patent No. 1,811,796 or German Laid-Open Application DOS No. 2,524,243 or DOS No. 2,528,73 or German Patent Application No. P 28 55 188, the dye gives olive green dyeings or prints, having excellent lightfastness and wetfastness, on cotton or cotton/polyethylene terephthalate union fabrics.

In polystyrene, the dye gives very fast olive green colorations.

EXAMPLE 2

Following the procedure described in Example 1, but using 51 parts of 2,4,6-tribromoaniline→1-benzylaminopyrazole as the starting dye, the corresponding bromine-containing nickel complex is obtained, which gives exceptionally fast olive green colorations in polystyrene.

EXAMPLE 3

Following the procedure described in Example 1, but using, as the starting dye, 2,4-difluoro-6-bromoaniline→1-benzyl-5-aminopyrazole, a nickel complex of the probable formula

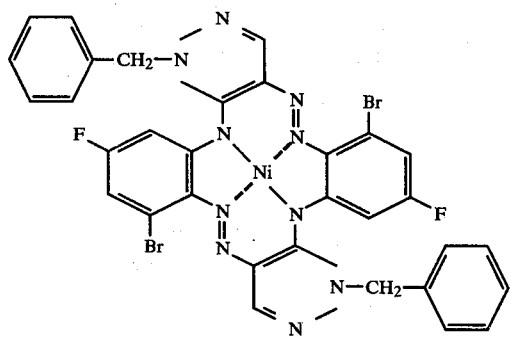

is obtained. When applied to cotton or polyester or cotton/polyester union fabrics, by the methods listed in Example 1, very lightfast and wetfast yellowish green dyeings and prints are obtained.

EXAMPLE 4

Following the method described in Example 1, 30 parts of 2,4,6-trichloroaniline→1-methyl-5-aminopyrazole are reacted with nickel nitrate and potassium carbonate in 150 parts of dimethylformamide for 15 hours at 90° C. After cooling, the olive green reaction product is filtered off and washed with dimethylformamide, methanol and water. Used as an aqueous dispersion, the product gives exceptionally fast olive green dyeings on cotton/polyester union fabrics and on pure polyester by the thermosol process. The novel dye essentially has the probable formula:

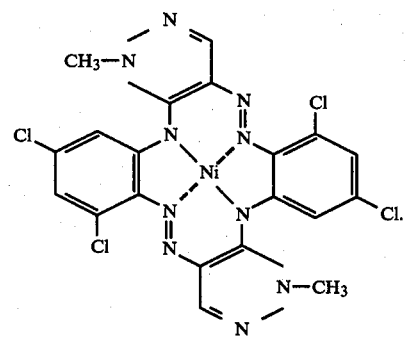

Using the methods described above, the corresponding nickel complexes can be obtained from the compounds of the formula

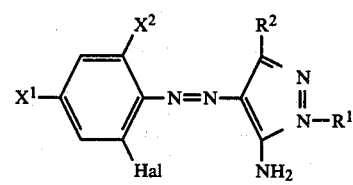

where Hal is Cl or Br and the other substituents have the meanings shown in the Table:

| Example | R₁ | R₂ | X₁ | X₂ | Hue | Substrate |
|---|---|---|---|---|---|---|
| 5 | C₆H₅-CH₂- | H- | 4-Cl-C₆H₄-O- | Br- | olive | C; PS |
| 6 | " | " | (H₉C₄)₂N-CO- | " | " | " |
| 7 | " | " | C₂H₅-CH(C₄H₉)-CH₂NH-CO- | " | " | PS |
| 8 | " | " | C₂H₅-CH(C₄H₉)-CH₂-O-CO- | " | " | " |
| 9 | " | " | (CH₃)₂N-SO₂- | Cl- | " | " |
| 10 | " | " | H- | " | " | C/PES; PS |
| 11 | cyclohexyl- | " | Cl- | " | " | " |
| 12 | " | " | H- | " | " | " |
| 13 | furfuryl (2-furyl-CH₂-) | " | Cl- | " | " | " |
| 14 | " | " | H- | " | " | " |
| 15 | CH₃-CH(CH₃)-CH₂- | " | " | H- | brownish olive | " |
| 16 | cyclohexyl- | " | F- | Br- | yellowish green | " |
| 17 | " | " | H- | Cl- | olive green | " |
| 18 | " | " | 4-Cl-C₆H₄-O- | Br- | olive | " |

In this Table and subsequent Tables, C = cotton, PES = polyester, PS* = polystyrene.

Structure:

X¹—(C₆H₃ with X² and Hal)—N=N—(pyrazole with R², N-NH-R¹, NH₂)

| Example | R₁ | R₂ | X₁ | X₂ | X₃ | Hue of dyeings on C or C/PES, or of colorations in polystyrene |
|---|---|---|---|---|---|---|
| 19 | C₆H₅- | CH₃- | CH₃- | CH₃- | H- | lime green |
| 20 | " | " | Br- | Br- | " | olive |
| 21 | " | " | CH₃- | " | " | " |
| 22 | " | " | H- | Cl- | " | " |
| 23 | " | " | Cl- | H- | Cl- | " |
| 24 | " | " | H- | " | CF₃- | " |
| 25 | " | " | Cl- | Cl- | H- | " |

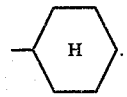

| Example | R₁ | R₂ | X₁ | X₂ | X₃ | Hue of dyeings on C or C/PES, or of colorations in polystyrene |
|---|---|---|---|---|---|---|
| 26 | " | H | " | " | " | " |

EXAMPLE 27

A mixture of 31 parts of the dried coupling product 2-chloroaniline→1-benzylaminopyrazole, 14 parts of nickel nitrate hexahydrate, 47 parts of potassium carbonate and 1,000 parts by volume of dimethylformamide is stirred for 7 hours under reflux. When it has cooled, the reaction batch is filtered and the filtrate stirred into a dilute sodium chloride solution prepared from 3,000 parts by volume of water and 1,000 parts by volume of saturated sodium chloride solution. The dye which precipitates is filtered off, thoroughly washed with water and suction-dried. The moist paste obtained is converted to an aqueous dispersion in a conventional manner, and the dispersion is used to dye or print a cotton or cotton/polyester fabric by the methods listed in Example 1; outstandingly fast olive hues are obtained. The new dye in part has the probable formula

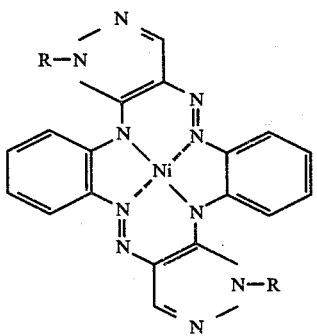

where R is

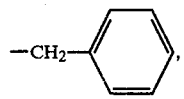

but also contains other products.

EXAMPLE 28

60 parts of o-chloroaniline→1-cyclohexyl-5-aminopyrazole, 28 parts of nickel nitrate hexahydrate, 100 parts of potassium carbonate and 2,000 parts of dimethylformamide are stirred for 30 hours under reflux and then worked up as described in the preceding Example. The dye obtained probably in part corresponds to the above formula, where R is A fabric consisting of 65 parts of polyester fibers and 35 parts of mercerized cotton is impregnated with a liquor which contains 10 g/l of a 20% strength liquid formulation of the above disperse dye and 80 g/l of a swelling agent and dye solvent comprising a mixture of 3 parts of polyethylene glycol of molecular weight 1,500 and 1 part of a reaction product of 1 mole of neopentanediamine and 15.6 moles of ethylene oxide. The pH of the padding liquor is brought to 6 with glutaric acid. The fabric is impregnated with the liquor, the wet pick-up being 45%. It is then dried for 60 seconds at 120° C. and fixed for 90 seconds at 225° C. in a continuous laboratory dryer. Thereafter, the fabric is rinsed cold and warm and washed for 5 minutes at 100° C. in the presence of a commercial detergent. The dye proves to be almost completely fixed to the fabric. A very lightfast, washfast and rubfast olive dyeing is obtained.

EXAMPLE 29

23 parts of the coupling product 3-bromo-4-aminoazobenzene→1-benzyl-5-aminopyrazole, 500 parts by volume of dimethylformamide, 7 parts of nickel nitrate hexahydrate and 23 parts of potassium carbonate are stirred for 10 hours at 80° C. 1,000 parts by volume of methanol are added dropwise to the reaction mixture at ambient temperature, followed by 100 parts by volume of water. The reaction product which precipitates is filtered off, washed with methanol and water and dispersed in water. In the light of its bromine content of 5.2%, the dye may be a mixture of the non-cyclized and cyclized nickel complexes of the formulae:

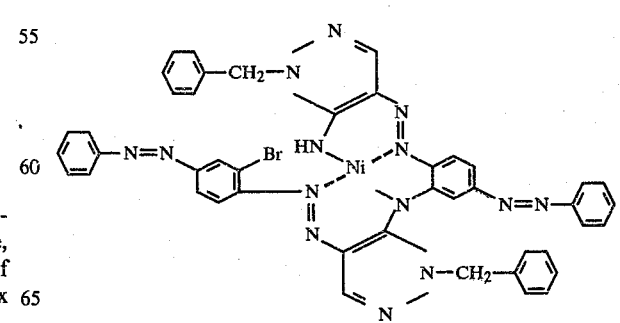

and

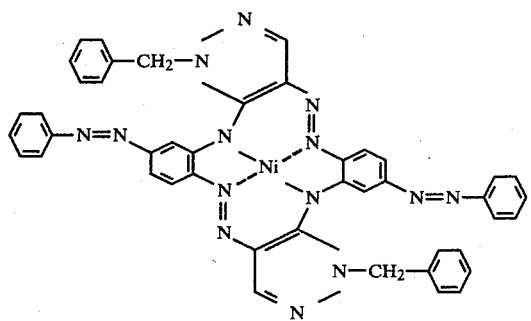

respectively, with additional subsidiary constituents.

10 parts of this dye are mixed with 100 parts of polyethylene oxide of molecular weight 300 and 790 parts of a 3% strength alginate thickener to give an ink, with which a 65:35 (by weight) polyester/cotton union fabric is printed by rotary screen printing. The fabric is then dried at 100° C., treated with live steam at 200° C. for 2 minutes, rinsed cold, soaped at the boil, again rinsed cold and dried. A lightfast, washfast, solvent-fast and sublimation-fast yellowish orange print on a white ground is obtained. A similar result is obtained when printing on pure cotton fabric.

On using the starting compounds shown in the Table which follows, nickel-containing dyes which are cyclized to a greater or lesser extent, depending on the reaction temperature and on the reactivity of the halogen to be replaced, are obtained.

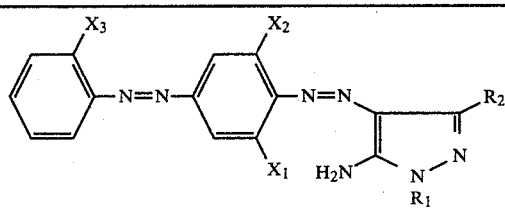

|  |  |  |  |  |  | Nickel complex | |
|---|---|---|---|---|---|---|---|
| Example | $X_1$ | $X_2$ | $X_3$ | $R_1$ | $R_2$ | Hue | Substrate |
| 30 | —Br | —H | —H | —⟨phenyl⟩ | —CH$_3$ | brown | C/PES |
| 31 | " | " | " | —⟨cyclohexyl-H⟩ | —H | " | " |
| 32 | " | " | " | —CH$_2$—⟨furyl⟩ | " | " | " |
| 33 | " | " | " | —CH$_2$—CH(C$_2$H$_5$)—C$_4$H$_9$ | " | " | " |
| 34 | " | —CH$_3$ | —CH$_3$ | —CH(CH$_3$)—CH$_3$ | —CH$_3$ | " | " |
| 35 | " | " | " | —CH$_2$—⟨furyl⟩ | —H | " | " |
| 36 | " | " | " | —⟨cyclohexyl-H⟩ | " | " | " |
| 37 | " | " | " | —⟨phenyl⟩ | —CH$_3$ | " | " |
| 38 | " | " | " | —CH$_2$—⟨phenyl⟩ | —H | " | " |

-continued

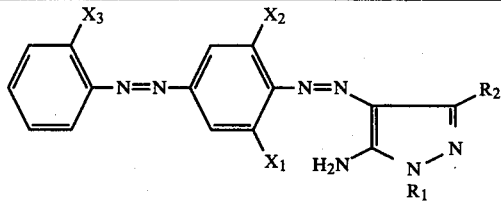

| Example | $X_1$ | $X_2$ | $X_3$ | $R_1$ | $R_2$ | Nickel complex Hue | Substrate |
|---|---|---|---|---|---|---|---|
| 39 | " | —Br | —H | " | " | " | " |
| 40 | " | " | " | ![cyclohexyl] | " | " | " |
| 41 | " | " | " | —CH$_2$-furyl | " | " | " |

EXAMPLE 42

7 parts of nickel nitrate hexahydrate, 25 parts of potassium carbonate, 24 parts of the dried dye 1-amino-2-bromoanthraquinone→1-benzylaminopyrazole (in powder form) are stirred into 250 parts by volume of dimethylformamide for 7 hours at 50° C. When the reaction mixture has cooled, 250 parts by volume of methanol are added gradually, with continued stirring, and the nickel-containing dye which has precipitated is filtered off and washed with methanol and water. After drying under reduced pressure at 70° C., the product is in the form of a bluish black powder, which gives a dull blue solution in hot N-methylpyrrolidone. If the product is converted to an aqueous dispersion and applied to cotton/polyester union fabric by the methods listed in Example 1, bluish gray hues having excellent properties are obtained.

The novel dye probably has the formula (X=H)

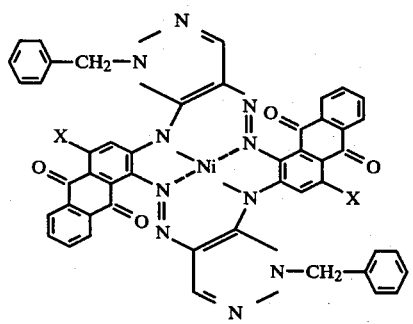

but contains subsidiary components.

EXAMPLE 43

28 parts of 1-amino-2,4-dibromoanthraquinone→1-benzyl-5-aminopyrazole in 500 parts by volume of dimethylformamide are reacted with 7 parts of nickel nitrate hexahydrate and 23 parts of potassium carbonate for 12 hours at 40° C. After the mixture has cooled to room temperature, the nickel-containing cyclized product is isolated by filtering off and washing with a small amount of DMF, then with methanol and thereafter with water. After drying, a bluish black powder of the above formula, where X is Br, is obtained; on cotton/polyester, this product gives very fast bluish gray dyeings.

The following starting compounds may be converted to nickel-containing dyes by similar methods:

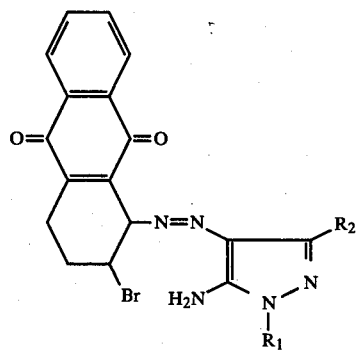

| Example | $R_1$ | $R_2$ | Hue | Substrate |
|---|---|---|---|---|
| 44 | phenyl | —CH$_3$ | bluish gray | C/PES |
| 45 | —CH$_2$—CH(C$_2$H$_5$)(C$_4$H$_9$) | —H | bluish gray | " |
| 46 | —CH$_2$-furyl | —H | bluish gray | " |

EXAMPLE 47

The procedure described in Example 42 is followed, but using, as the starting compound, an equal amount of 2-amino-3-bromoanthaquinone→1-benzyl-5- aminopyrazole. After 10 hours' reaction at 70° C., and conventional working up, a brown powder is obtained, which gives fast brown dyeings on cotton, polyester and cotton/polyester union fabrics.

EXAMPLE 48

If 21 parts of 1-amino-2-chloroanthraquinone→1-cyclohexylaminopyrazole are used, with the additives of Example 42, a bluish black powder is obtained after 10 hours at 60° C.; an aqueous dispersion of the product gives very fast bluish gray dyeings and prints on cotton, polyester and cotton/polyester union fabrics.

EXAMPLE 49

A mixture of 40 parts of 2-bromo-4-nitroaniline→1-benzylaminopyrazole, 14 parts of nickel nitrate hexahydrate, 50 parts of potassium carbonate and 250 parts by volume of dimethylformamide is stirred for 20 hours at 70° C. The reaction product obtained is precipitated by gradually adding 500 parts by volume of methanol and 300 parts by volume of water and is filtered off and washed with methanol and water. The dark brown powder obtained after drying dissolves in N-methylpyrrolidone. An aqueous dispersion of the novel dye gives very lightfast and wetfast dark brown hues on cotton, polyester and cotton/polyester union fabrics.

EXAMPLE 50

24 parts of 2,6-dibromo-4-nitroaniline→1-benzyl-5-aminopyrazole in 50 parts by volume of dimethylformamide are stirred with 27 parts of potassium carbonate and 14 parts of NiCl$_2$.6H$_2$O for 14 hours at 50° C. When the batch had cooled, the product is filtered off, washed with methanol and water and dried. A further portion of the pure reaction product can be isolated from the filtrate by adding methanol and water. The nickel-containing dye gives lightfast brown hues on polyester.

EXAMPLE 51

43 parts of 2,4-dinitro-6-bromoaniline→1-cyclohexylaminopyrazole, 250 parts by volume of dimethylformamide, 14 parts of nickel nitrate hexahydrate and 50 parts of potassium carbonate are stirred for 5 hours at 50° C. and nickel complex obtained is isolated by filtering off at room temperature and drying. The brown powder obtained gives lightfast and wetfast brown dyeings on cotton and on polyester.

EXAMPLE 52

21 parts of 6-bromo-4-nitro-2-cyanoaniline→1-benzyl-5-aminopyrazole are stirred with the additives described in Example 42 for 13 hours at 40° C. and the product is precipitated with methanol and water. A brown powder is obtained, which, in aqueous dispersion, gives very lightfast and wetfast brown hues on cotton, polyester and cotton/polyester union fabrics.

EXAMPLE 53

A mixture of 20 parts of 2,6-dibromoaniline-4-carboxylic acid ethyl ester→1-benzylaminopyrazole, 14 parts of nickel nitrate hexahydrate, 47 parts of potassium carbonate and 1,000 parts by volume of dimethylformamide is stirred for 6 hours at 60° C. and the reaction product is isolated by filtering off and washing with methanol and water. After drying at 60° C., a brown powder is obtained, which, used in aqueous dispersion under the conditions quoted in Example 1, gives fast brown dyeings on cotton.

The dye probably essentially corresponds to the formula

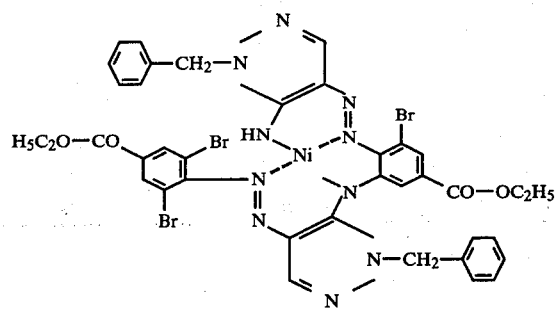

EXAMPLE 54

A mixture of 10 parts of 2,4,6-trichloroaniline→1-benzylaminopyrazole, 13 parts of 2,4,6-tribromoaniline→1-benzyl-5-aminopyrazole, 7 parts of nickel nitrate hexahydrate, 25 parts of potassium carbonate and 500 parts of dimethylformamide is stirred for 6 hours at 100° C. and the reaction product is filtered off at ambient temperature, washed with a small amount of dimethylformamide and then with methanol and water, and dried. An olive powder is obtained, which is soluble in N-methylpyrrolidone and gives very lightfast colorations in polystyrene. On cotton, polyester and cotton/polyester union fabrics, very lightfast and wetfast dyeings and prints are obtained.

The dye probably essentially has the formula

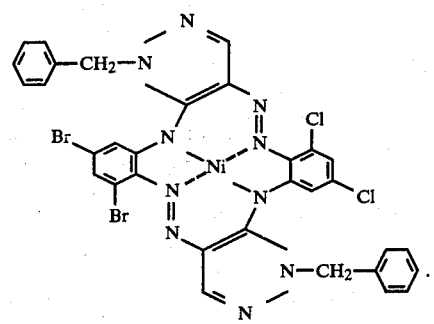

EXAMPLE 55

A mixture of 12 parts of 3-bromo-4-aminoazobenzene→1-benzylaminopyrazole, 11 parts of 3-bromo-4-aminoazobenzene→cyclohexylaminopyrazole, 7 parts of nickel nitrate hexahydrate, 25 parts of potassium carbonate and 500 parts of dimethylformamide is stirred for 6 hours at 120° C.; after cooling, 500 parts by volume of methanol and 60 parts of water are added and the product is filtered off, washed in a conventional manner and dried. The dark brown powder obtained gives very fast deep brown dyeings on cotton, polyester and blends of both.

EXAMPLE 56

A mixture of 36 parts of 2-chloroaniline-5-carboxylic acid amide→1-phenyl-3-methyl-5-aminopyrazole, 14 parts of nickel nitrate, 50 parts of potassium carbonate and 250 parts by volume of dimethylformamide is stirred for 16 hours at 120° C. The reaction product is filtered off after cooling, and is washed with dimethylformamide and then with methanol and water. After drying, a dark green powder is obtained, which is exceptionally suitable for use as a pigment. In a full-shade surface coating, it gives a greenish black.

EXAMPLE 57

13 parts of 2,4,6-trichloroaniline→1-benzyl-5-aminopyrazole, 12 parts of 2,4,6-trichloroaniline→1-(2-furylmethyl)-5-aminopyrazole, 250 parts by volume of dimethylformamide, 10 parts of nickel nitrate hexahydrate and 35 parts of potassium carbonate are stirred for 7 hours at 100° C. The product is filtered off at room temperature, washed in a conventional manner and dried, giving an olive green powder which dyes cotton/polyester union fabrics in fast olive hues.

The dye is possibly a mixture of complexes containing:

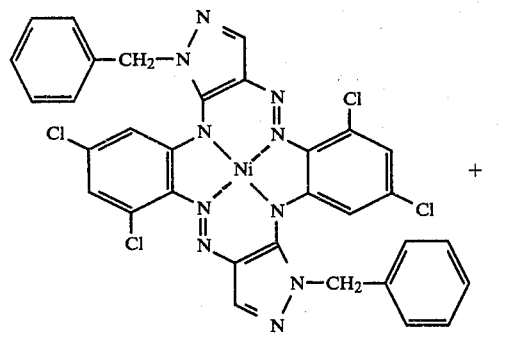

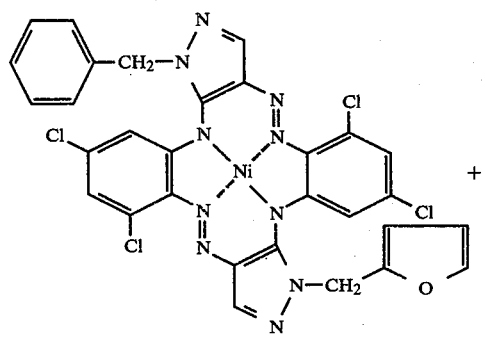

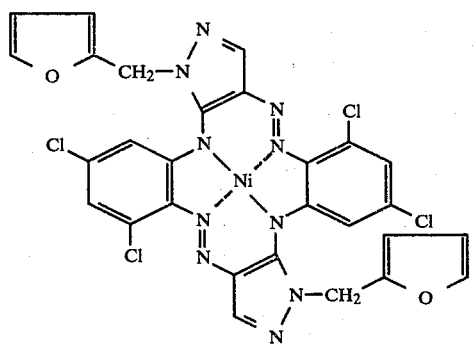

EXAMPLE 58

25 parts of 2′,3-dimethyl-4-amino-5-bromoazobenzene→1-(2′-ethyl)-hexyl-5-aminopyrazole, 7 parts of nickel nitrate hexahydrate, 23 parts of potassium carbonate and 100 parts by volume of dimethylformamide are stirred for 6 hours at 100° C. After the mixture has cooled, the nickel-containing dye is precipitated by adding 250 parts by volume of methanol. It is then filtered of, washed with methanol and water and dried at room temperature. The dark brown powder thus obtained is exceptionally suitable for use as a solvent dye, because of its excellent solubility in organic solvents, such as methyl ethyl ketone, ethyl acetate or toluene, and also gives deep colorations in polystyrene. In all applications, brown hues of excellent lightfastness are obtained.

EXAMPLE 59

A mixture of 40 parts of 2,4,6-trichloroaniline→1-(2′-ethyl)-hexyl-5-aminopyrazole, 14 parts of nickel nitrate hexahydrate, 47 parts of potassium carbonate and 250 parts by volume of dimethylformamide is stirred for 11 hours at 100° C. When it has cooled, the supernatant liquid is decanted from the viscous-crystalline precipitate formed, and the latter is dissolved by heating in 400 parts by volume of dimethylformamide. The clear solution thus obtained is treated progressively, at 35° C., with 400 parts by volume of methanol and then with 25 parts of water, whereupon the nickel-containing dye separates out as crystals, which are filtered off and washed with methanol. After drying at room temperature, a dark olive powder is obtained, which easily dissolved in methyl ethyl ketone, ethyl acetate, toluene, ethanol or ethylglycol, giving an olive green color, and is therefore exceptionally suitable for use as a very lightfast solvent dye. Very lightfast olive colorations are also obtained in polystyrene.

EXAMPLE 60

28 parts of 3,5-dibromo-4-aminoazobenzene→1-benzyl-5-aminopyrazole in 500 parts by volume of dimethylformamide are stirred with the usual additives for 14 hours at 50° C. When the reaction batch has cooled, it is filtered and the nickel-containing dye is precipitated from the filtrate by adding 500 parts by volume of dimethylformamide and 100 parts of water, and is isolated in a conventional manner. The dried powder, which in aqueous dispersion gives fast brown hues on cotton/polyester, probably has the formula

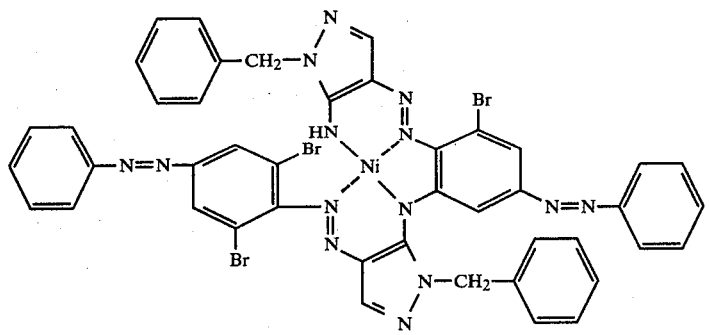

EXAMPLE 61

A mixture of 24 parts of 3-bromo-4-aminonaphthalic acid-3'-methoxypropylimide→1-benzyl-5-aminopyrazole, 7 parts of nickel nitrate hexahydrate, 23 parts of potassium carbonate and 250 parts of dimethylformamide is stirred for 6 hours at 60° C. and when the mixture has cooled the reaction product is precipitated by adding 750 parts by volume of methanol. After conventional isolation and drying, a dark brown powder is obtained, which gives lightfast reddish brown dyeings on cotton/polyester. The dye has the probable formula:

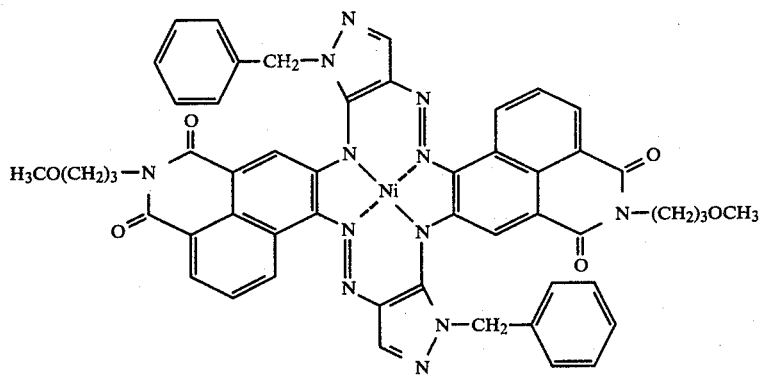

EXAMPLE 62

11 parts of 3-amino-4-bromonaphthalimide→1-phenyl-3-methyl-5-aminopyrazole, 250 parts by volume of dimethylformamide, 3 parts of nickel nitrate hexahydrate and 11 parts of potassium carbonate are stirred for 10 hours at 90° C. The product is isolated and dried, giving a dark brown, insoluble powder, which may be used as a brown pigment.

EXAMPLE 63

If, in Example 1, 500 parts by volume of dimethylsulfoxide or 200 parts by volume of N-methylpyrrolidone are used in place of 500 parts by volume of dimethylformamide, under otherwise identical reaction conditions, the same nickel-containing dye as in Example 1 is obtained.

EXAMPLE 64

If, in Example 3, the starting dye mentioned there is replaced by 2,4-difluoro-6-bromoaniline→1-cyclohexyl-5-aminopyrazole, a corresponding nickel complex is obtained, which gives very lightfast green colorations in polystyrene.

EXAMPLE 65

A mixture of 20 parts of the coupling product 1-bromo-2-aminonaphthalene→1-phenyl-3-methyl-5-aminopyrazole, 7 parts of nickel nitrate hexahydrate, 23 parts of potassium carbonate and 250 parts by volume of dimethylformamide is heated under reflux until virtually no further starting dye is detectable by thin layer chromatography. When the mixture has cooled to room temperature, the reaction product is precipitated by adding 500 parts by volume of methanol and is filtered off and washed, and dried, in a conventional manner. A brown powder is obtained, which dyes cotton/polyester union fabrics in lightfast and wetfast brown hues. The novel dye probably has the formula

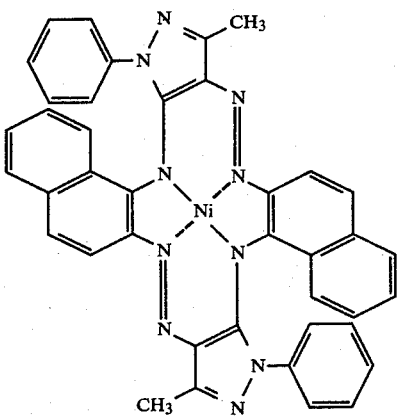

EXAMPLE 66

24 parts of the starting dye 2,4-dibromo-1-aminonaphthalene→1-phenyl-3-methyl-5-aminopyrazole are stirred with the same additives as in the preceding Example for 8 hours at 110° C. After cooling, filtering off the product, and washing and drying it, a brown powder is obtained, which dyes polyester/cotton union fabrics in fast brown hues. In polystyrene, brown colorations are obtained.

EXAMPLE 67

22 parts of the coupling product of the formula

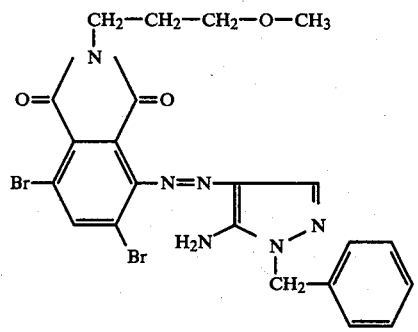

are stirred with 250 parts by volume of dimethylformamide, 7 parts of nickel nitrate hexahydrate and 23 parts of potassium carbonate for 6 hours at 40° C. After the mixture has cooled, the reaction product is precipitated by adding 250 parts by volume of methanol and is filtered off, washed and dried. A reddish brown powder is obtained, which gives fast dull bluish red hues on cotton, polyester and cotton/polyester union fabrics. If a starting dye containing a cyclohexyl radical in place of the benzyl radical is used, a nickel complex of corresponding structure is obtained under the same conditions.

EXAMPLE 68

If, in Example 61, the benzyl radical in the starting dye is replaced by a phenyl radical and in other respects the procedure described is followed, the nickel complex obtained is again reddish brown and has similar tinctorial properties.

EXAMPLE 69

24 parts of the coupling product of the formula

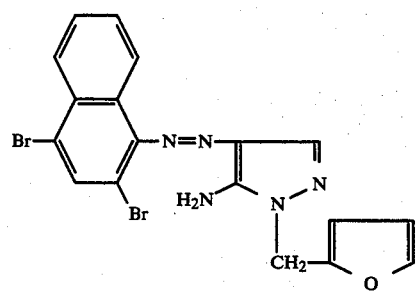

in 350 parts by volume of dimethylformamide are stirred with 7 parts of nickel nitrate hexahydrate and 23 parts of potassium carbonate for 5 hours at 100° C. When the mixture has cooled, 500 parts by volume of methanol are added and the brown nickel complex precipitated in this way is isolated in a conventional manner. The product dyes polyester, cotton and polyester/cotton union fabrics in outstandingly fast deep brown hues.

EXAMPLE 70

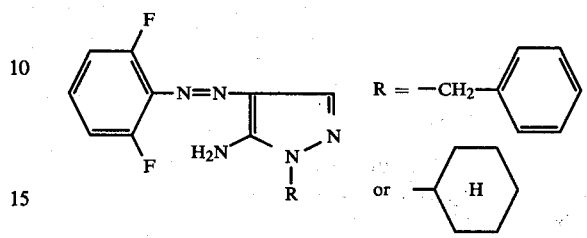

30 parts of one of the coupling products of the above formula, 14 parts of nickel nitrate hexahydrate, 47 parts of potassium carbonate and 500 parts by volume of dimethylformamide are stirred at 100° C. until a thin layer chromatogram shows complete reaction; this requires 6–12 hours. When the mixture has cooled, the nickel complex which has crystallized out is filtered off, and washed and dried in a conventional manner. In each case, a dark green powder is obtained, which gives yellowish green dyeings and colorations, having excellent properties, on polyester and cotton and in polystyrene.

EXAMPLE 71

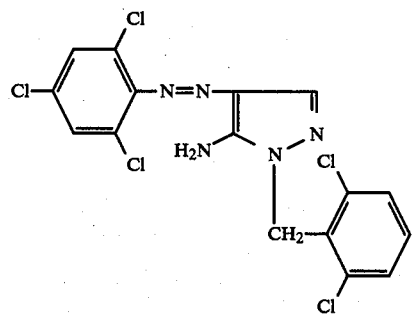

21 parts of the dye of the above formula are stirred for 8 hours at 100° C. with the usual additives and the product is isolated cold. An olive nickel complex is obtained, which colors polystyrene in exceptionally lightfast olive hues.

I claim:
1. A nickel complex obtained by heating one or more compounds of the formula

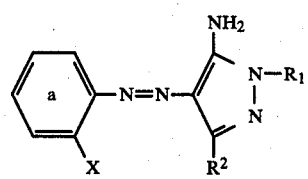

where
$R_1$ is cyclohexyl, methylcyclohexyl, phenyl $C_1$–$C_4$-alkyl, said phenyl being unsubstituted or substituted by chloro, methyl or is furylmethyl;
$R_2$ is hydrogen;

X is fluorine, chlorine, bromine or phenoxy, and the ring a is further unsubstituted or is further substituted by fluorine, chlorine, bromine, trifluoromethyl, $C_1$–$C_4$ alkyl, chlorophenoxy, methylphenoxy, cyano, nitro, $C_1$-to-$C_4$-alkylsulfonyl, phenylsulfonyl, $C_1$-to-$C_{10}$-alkoxycarbonyl, carbamyl, sulfamyl, phthaloyl, phenylazo or phenylazo substituted by fluorine, chlorine, bromine, methyl, ethyl, cyano, nitro or $C_1$–$C_{10}$-alkoxy carbonyl, in an organic solvent in the presence of an acid acceptor and of a nickel compound.

2. A nickel complex according to claim 1 where the ring a is substituted by fluorine, chlorine, bromine, trifluoromethyl, $C_1$–$C_4$-alkyl, cyclohexyl, $C_1$–$C_4$-alkoxy, aroxy, cyano, nitro, $C_1$–$C_4$-alkylsulfonyl, arylsulfonyl, a carboxylic acid ester group, unsubstituted or substituted carbamyl or sulfamyl, unsubstituted or substituted phenylazo or phthaloyl.

3. A nickel complex according to claim 1 where X is fluorine, chlorine or bromine.

4. A nickel complex according to claim 1 where $R^1$ is cyclohexyl, benzyl or furylmethyl.

5. The nickel complex of claim 1 wherein the ring a is substituted by fluorine, chlorine, bromine, trifluoromethyl, methyl, methoxy, ethyoxy, phenoxy, chlorophenoxy, methylphenoxy, cyano, nitro, methylsulfonyl, ethylsulfonyl, phenylsulfonyl, $C_1$-to-$C_4$-alkylsubstituted carbamyl or sulfamyl, phthaloyl or phenylazo.

6. A nickel complex obtained by heating one or more compounds of the formula

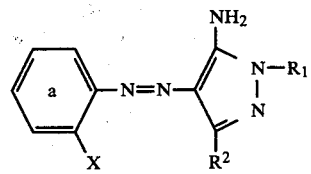

where
$R_1$ is cyclohexyl, methylcyclohexyl, phenyl $C_1$–$C_4$-alkyl said phenyl being unsubstituted or substituted by chloro or methyl or is furylmethyl;
$R_2$ is hydrogen;
X is fluorine, chlorine, bromine or phenoxyn and the ring a is further unsubstituted or is further substituted by fluorine, chlorine, bromine or phenylazo, in an organic solvent, in the presence of an acid acceptor and of a nickel compound.

* * * * *